Sept. 24, 1963    F. D. BERGSTEIN ETAL    3,104,596
PROCESS AND APPARATUS FOR THE MANUFACTURE OF
MULTIPLE-CELL INNER-LINED CONTAINERS
Filed Oct. 17, 1960    3 Sheets-Sheet 1
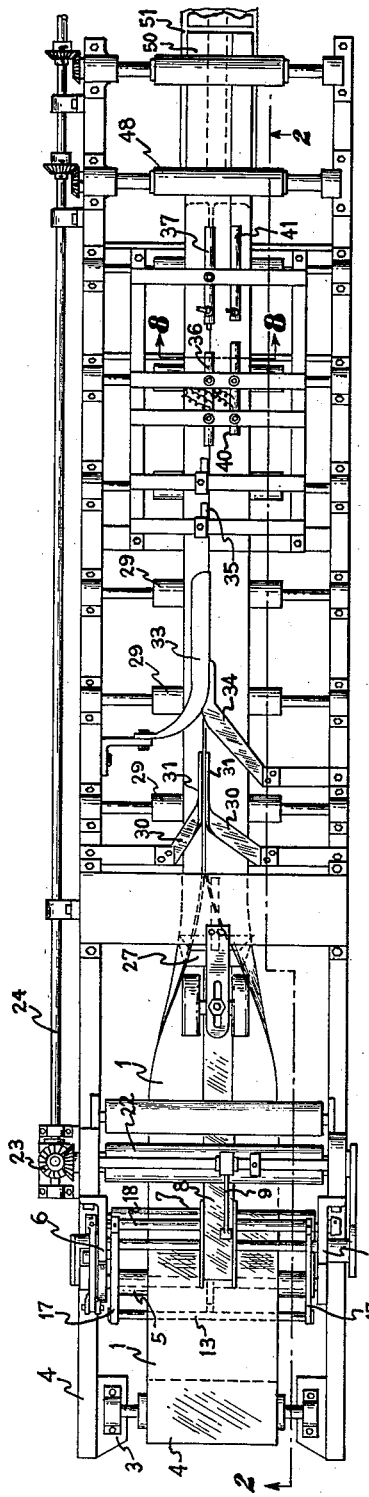
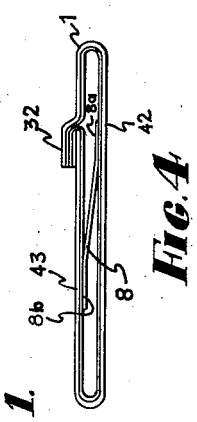
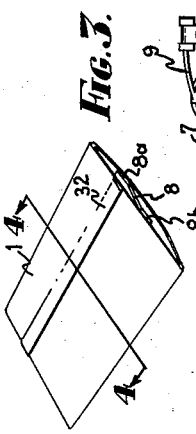
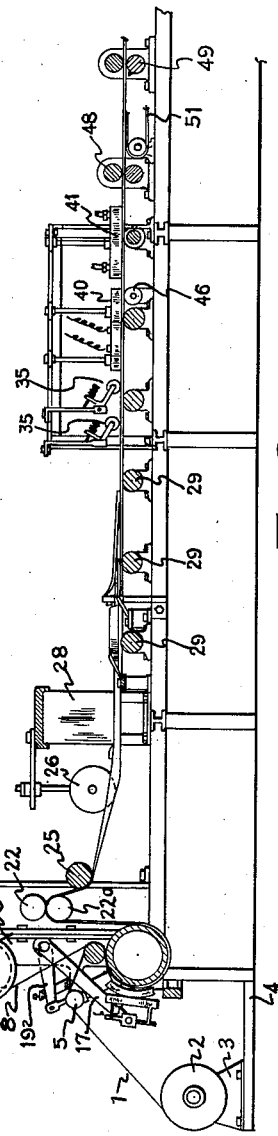
INVENTOR.
FRANK D. BERGSTEIN,
BY ROBERT W. NERENBERG,
LEONARD BACK
ATTORNEYS, Sept. 24, 1963 F. D. BERGSTEIN ETAL 3,104,596
PROCESS AND APPARATUS FOR THE MANUFACTURE OF
MULTIPLE-CELL INNER-LINED CONTAINERS
Filed Oct. 17, 1960 3 Sheets-Sheet 2

INVENTOR.
FRANK D. BERGSTEIN,
BY ROBERT W. NERENBERG,
LEONARD BACK,
Allen & Allen
ATTORNEYS.

Sept. 24, 1963 F. D. BERGSTEIN ETAL 3,104,596
PROCESS AND APPARATUS FOR THE MANUFACTURE OF
MULTIPLE-CELL INNER-LINED CONTAINERS
Filed Oct. 17, 1960 3 Sheets-Sheet 3

INVENTOR.
FRANK D. BERGSTEIN,
BY ROBERT W. NERENBERG,
LEONARD BACK,

Allen & Allen
ATTORNEYS.

3,104,596
PROCESS AND APPARATUS FOR THE MANUFACTURE OF MULTIPLE-CELL INNER-LINED CONTAINERS
Frank D. Bergstein, Wyoming, Robert W. Nerenberg, Middletown, and Leonard Back, Hamilton, Ohio, assignors to Interstate Folding Box Company, Middletown, Ohio, a corporation of Ohio
Filed Oct. 17, 1960, Ser. No. 63,176
16 Claims. (Cl. 93—36.01)

This invention relates to the manufacture of paperboard containers, and relates more particularly to the provision of a knock-down carton having a sleeve-like inner liner adapted to be sealed across its opposite ends to provide a proofed package, the liner being partitioned internally to define a plurality of compartments or cells adapted to be individually opened so as to dispense a portion only of the contents of the package.

In recent years there has been a marked increase in the packaging of dehydrated foodstuffs, prepared mixes for cakes, and the like, all of which require an essentially moisture proof package in order to maintain the ingredients in usable condition. Diverse forms of liners have been employed comprising foils, non-fibrous films, and various combinations thereof, which impart the desired proofing characteristics to the packages. A particularly successful liner combination comprises aluminum foil laminated to paper as a supporting web, with the exposed surface of the foil coated with polyethylene which is readily heat-sealable, thereby facilitating the closing and tight sealing of the liner without the necessity of an added adhesive bond.

However, in many instances it is desirable that the contents of the package be segregated or separated into individual units, either where the units comprise different constituent materials or wherein only a part of the contents are to be used at any given time. For example, instant whipped potatoes may be packaged in a carton containing enough material for sixteen servings, whereas the housewife may be desirous of making up only enough mix for eight servings. In such event, the package may be conveniently divided into twin compartments each containing the required quantity of mix for eight servings. Similarly, in the case of cake mixes and the like, one compartment may be utilized for the cake ingredients, whereas the other may be utilized for the icing ingredients, or otherwise as required. While various forms of multiple-cell carton structures have hitherto been proposed, they have for the most part consisted of individual packages or tubular liners inserted inside the carton. The packaging machines for this type of operation are comparatively slow in operation, and the cost of the package is quite high, with the result that this type of package has not enjoyed wide-spread usage.

Accordingly, the principal object of the instant invention is the provision of a low cost, easily manufactured and efficient divided or compartmented inner-lined container.

A further object of the instant invention is the provision of a liner structure in the form of a tubular sleeve which is divided internally into a plurality of compartments or cells by means of an internal middle wall formed from an inherently fusible film, such as polyethylene, which is secured to the inner surfaces of the tubular liner along offset lines extending lengthwise of the opposite walls of the tubular liner.

Still a further object of the instant invention is the provision of a package structure of the character described which may be formed in an essentially continuous operation, the tubular liners including the internal dividing walls being continuously formed in one section of the package forming machine, the liners then being associated with the carton blanks and secured thereto in such fashion that the resultant structure will comprise a knocked-down, essentially tubular carton body surrounding and secured to the sleeve or liner structure in such a way that, as the carton is erected, the flat-folded tubular liner will be concurrently erected and brought to a condition in which the several compartments thereof may be readily filled and sealed.

Yet a further object of the invention is the provision of apparatus and techniques by means of which the foregoing operations may be readily performed in a high speed continuous operation, and wherein the position of the divider wall is accurately controlled so that the several compartments will be uniformly of prescribed size.

The foregoing, together with other objects of the instant invention which will appear hereinafter or which will be apparent to the skilled worker in the art upon reading these specifications, are accomplished by those structures, and by that apparatus and operating procedures of which certain exemplary embodiments shall now be described.

Reference is now made to the accompanying drawings wherein:

FIGURE 1 is a plan view of apparatus for forming the divided tubular sleeve.

FIGURE 2 is a vertical sectional view taken along the line 2—2 of FIGURE 1.

FIGURE 3 is a perspective view of a divided tubular sleeve or liner formed in accordance with the invention.

FIGURE 4 is an enlarged sectional view taken along the line 4—4 of FIGURE 3.

One of the principal difficulties encountered in the formation of a divided tubular liner is the positioning and attachment of the divider or partitioning strip. Preferably, the divider wall will comprise a strip of polyethylene film which is inherently fusible, and this will be heat fused to the liner material as an incident of its formation into a tube. Preferably, the liner will comprise a paper-foil laminate, the exposed surface of the foil being coated with a film of polyethylene or else having a film of polyethylene laminated thereto. It will be understood, of course, that other heat fusible materials or combinations thereof may be employed, although the specified materials have proven to be highly satisfactory.

Figure 5:
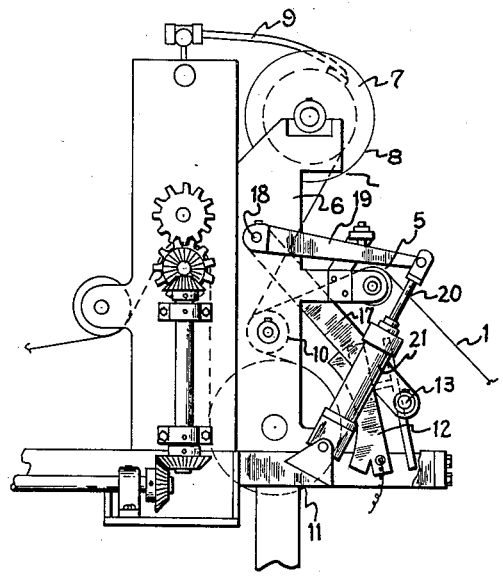
FIGURE 5 is an enlarged side elevational view of the mechanism for applying the divider to one side of the liner forming web.
Figure 6:
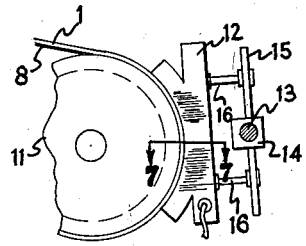
FIGURE 6 is an enlarged fragmentary elevational view of the heat sealing shoe forming a part of the mechanism of FIGURE 5.
Figure 7:
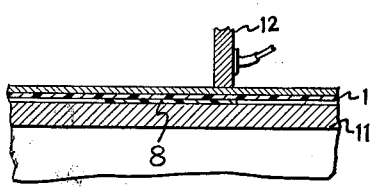
FIGURE 7 is an enlarged fragmentary sectional view taken along the line 7—7 of FIGURE 6.

Referring now to FIGURE 1, a supply of liner forming material 1 will be fed from a supply roll 2 mounted in a roll stand 3 at one end of the machine frame 4. The web 1 passes upwardly about an idler roll 5 which, as seen in FIGURE 5, is supported from a pair of standards 6, the standards mounting a reel 7 serving as a source of supply for the divider strip 8. The reel 7 will be freely rotatable and responsive to tension on the strip 8 to pay the strip from the reel, although a friction brake means 9 is preferably provided to prevent excessive unwinding of the strip material.

The lining material 1 and the divider strip 8 are jointly fed about a guide roll 10 with the divider strip outermost, whereupon the two webs of material are caused to jointly pass around a sealing roll 11 which, preferably, is formed from polished steel, the relatively large sealing roll acting to bring the two webs into intimate contact. A heating bar 12 in the form of a curved shoe shaped to conform to the cylindrical surface of the sealing roll 11 acts to seal one side edge of the divider strip to the liner material, forming a longitudinal seam 8a. It will be understood, of course, that the shoe 12 will be adjustable laterally of the roll 11 so that it may be aligned to overlie a marginal side edge of the divider strip; and the reel 7 which pays out the divider strip also will be adjustable so that the position of the seam 8a relative to the liner may be varied as desired. However, once the desired seam line has been established, it may be uniformly maintained. Preferably, the shoe 12 will be positioned to act upon the webs being joined shortly after they are brought into contact with the sealing roll; and the webs will be maintained in contact with the sealing roll around a portion of the roll beyond the sealing shoe so that the roll will serve to cool the seam which is formed.

It also has been found desirable to mount the sealing shoe for movement from an operative to an inoperative position upon the stoppage of the machine, thereby preventing over exposure of the sealing shoe to the heat fusible materials. In the embodiment illustrated, the shoe 12 is adjustably mounted on a supporting rod 13 by means of mounting blocks 14, supporting posts 15 and bracket 16. With this arrangement, the mounting blocks 14 may be adjusted relative to supporting rod 13 so as to conform the sealing shoe to the periphery of sealing roll 11. The supporting rod 13 is received adjacent its opposite ends by arms 17 fixedly secured at their opposite ends to rock shaft 18 journaled in standards 6. One end of the rock shaft projects beyond the standard where it mounts a crank arm 19 the free end of which is pivotally connected to the piston rod 20 of a pneumatic or hydraulic cylinder 21 mounted on the machine frame. With this arrangement, outward movement of the piston rod 20 will move the sealing shoe 12 to the inoperative position, whereas movement of the piston rod in the opposite direction will act to move the sealing shoe in contact with the web passing around the sealing roll 11. Preferably, the cylinder 21 will be operatively connected to the drive mechanism for the machine, i.e., the pinch rolls which advance the formed webs, and such drive means may include solenoid switches or the like effective to selectively introduce fluid into the cylinder and evacuate it therefrom, depending upon the desired direction of movement of the piston rod.

As seen in FIGURES 1 and 2, the webs 1 and 8 may be advanced by means of the driven pinch rolls 22, 22a connected at one end by gears 23 to drive shaft 24. Upon passage between the pinch rolls 22, 22a, the webs may pass around an idler roll 25, whereupon the webs are contacted by the guide rolls 26 which position them for contact with the leading edge of the elongated former or mandrel 27 about which the liner is folded to form a tubular sleeve.

The two webs will pass beneath the leading edge of the former which may be supported from above by means of the bracket 28, and the opposite side edges of the liner will project laterally beyond the former, being supported by means of a series of freely rotatable rollers 29 which underlie the former. Suitable sweep means 30 are provided to infold the side edges of the liner about the mandrel, as will be well understood by the skilled worker in the art, the sweeps 30 terminating in vertically disposed trailing edges 31 which juxtaposed the opposite side edges of the liner to form an upstanding fin, such fin being indicated at 32 in FIGURE 4. The fin so formed is then folded-over or flattened against the upper surface of the now tubed liner by means of the folding bars 33 and 34, whereupon the folded seam is engaged and held in folded position by means of hold-down wheels 35. The hold-down wheels maintain the folded fin in position for subsequent contact by the heating bar 36 which acts to fuse together the juxtaposed marginal edges of the liner which, it will be remembered, are surfaced with polyethylene or other similar heat fusible material; and the heating bar may be followed by a cooling bar 37 which acts to cool the seam area. It is competent to point out that the formation of a tubular liner in the manner just described is a known expedient and has hitherto been employed in the manufacture of diverse form of tubular liners and the like. However, in accordance with the instant invention, the elongated former is also utilized as a vehicle for effecting a seal between the free side edge of the divider strip and the surrounding tubular liner.

Figure 9:
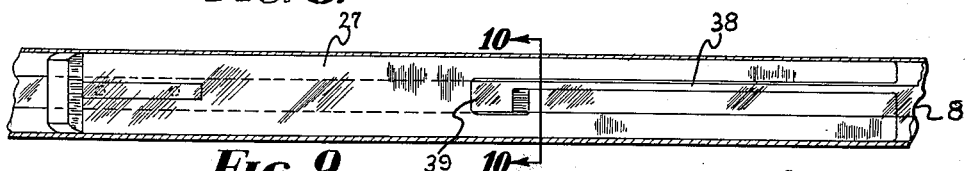
FIGURE 9 is an enlarged fragmentary plan view of one form of sleeve former or mandrel.
Figure 10:
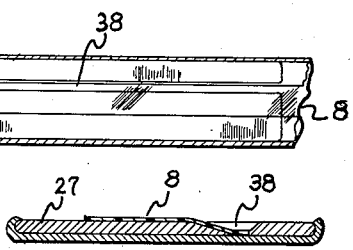
FIGURE 10 is an enlarged sectional view taken along the line 10—10 of FIGURE 9.

In accordance with one embodiment of the instant invention, the elongated former 27 is provided, as seen in FIGURE 9, with an elongated narrow slot 38 extending lengthwise thereof throughout the trailing end of the mandrel. Preferably, the slot 38 starts at a point intermediate the leading and trailing ends of the mandrel, preferably having an enlarged opening 39 which facilitates the threading of the divider strip 8 therethrough. That is, when the device is set up for operation, the leading edge of the divider strip will be fed through the opening 39 so that the free side edge thereof will overlie the former 27, as can be clearly seen in FIGURE 10. Preferably the slot 38 will be positioned in substantial alignment with the longitudinal seam 8a effected by the sealing shoe 12 so that theb ulk of the divider strip may overlie the mandrel, whereupon the free side edge of the divider strip may be heat sealed to the upper surface of the tubed liner by means of the heating bar 40 seen in FIGURES 1 and 2, the seam 8b so formed being subsequently cooled by means of the cooler 41. Referring again to FIGURE 4, it will thus be apparent that the divider strip 8 will be sealed along one longitudinal edge to the under wall 42 of the liner, whereas the opposite side edge will be sealed to the upper wall 43, the two lines of attachment being offset laterally with respect to each other, so that in the flat-folded condition of the liner, the divided strip 8 will lie essentially flat within the liner tube. However, the alignment of the seams is such that when the liner is associated with a carton blank and subsequently erected, the divider will extend transversely between the opposite walls of the liner and will divide it into two compartments of equal size. It will be understood, of course, that if the two compartments are to be of unequal size, the seams 8a and 8b may be displaced laterally of the liner by the desired amount.

Figure 8:
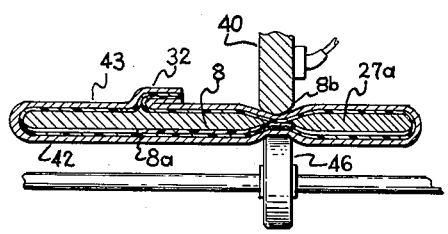
FIGURE 8 is an enlarged fragmentary sectional view taken along the line 8—8 of FIGURE 1.
Figure 11:
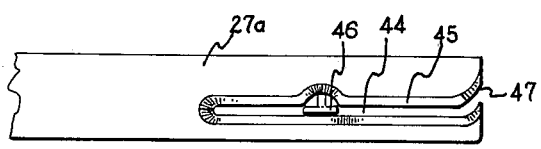
FIGURE 11 is a fragmentary plan view of an alternative form of mandrel.

In order to avoid the necessity of threading the divided strip through the slot 38 in the former, the alternative forming device illustrated in FIGURE 11 may be employed. As seen therein, the former 27a is also provided with an elongated slot 44 extending inwardly from the trailing end thereof, but in this instance the slot is positioned to overlie the free side edge of the divider strip. That is, the body of the divider strip will underlie the former with its free marginal edge only exposed through the slot 44 which, if desired, may be provided with beveled edges 45. A roller 46, which may be in the form of a small steel wheel mounted on roller bearings, is positioned beneath the former 27a in alignment with the slot 44 and arranged to project upwardly into the slot. The wheel 46 thus acts to press the under surface 42 of the liner and the free edge of the divider strip upwardly through the slot so that the free edge of the divider strip will be juxtaposed to the inner surface of the upper portion 43 of the liner, whereupon a seal is effected between the free side edge of the divider strip and the upper portion of the liner in the manner best seen in FIGURE 8.

As in the case of the embodiment previously described, the heating bar 40 will effect the seal 8b and the seal area will be subsequently contacted by the cooling bar 41. It will be evident, however, that the application of heat must be carefully controlled so as not to heat the divider strip to the extent that its undersurface will become sealed to the undersurface 42 of the liner. It has been found that this can be succesfully done with only minimal adherence of the divider strip to the undersurface of the liner. In order to offset any tendency for the divider strip to adhere to the liner, the slot 45 terminates at its trailing edge in an offset or hooked portion 47 which, as the tubed liner advances, will pass between the side edge of the divider strip, i.e. the seam 8b, and the undersurface 42 of the liner, thereby forcing them apart in the event they have been stuck together. As before, the operation just described results in the divider strip being sealed along its opposite side edges to the opposite sides of the liner, and when the liner is drawn to essentially tubular condition, it will be divided into separate compartments.

Figure 15:
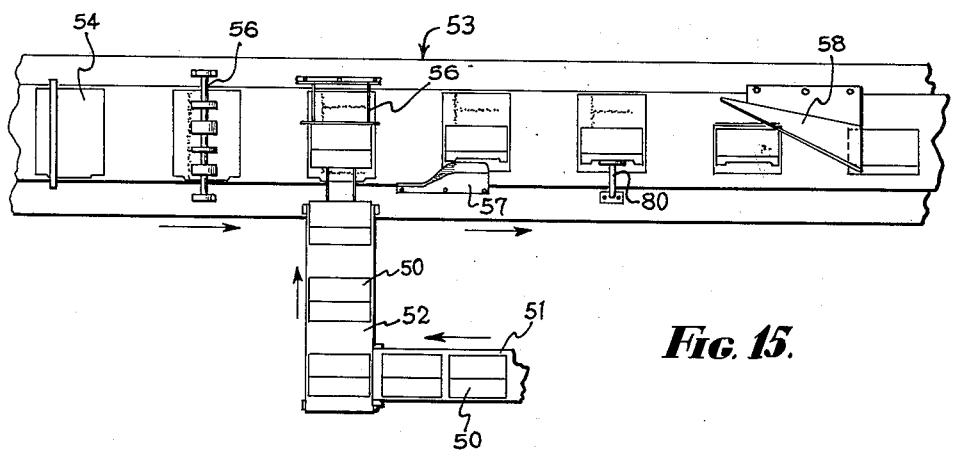
FIGURE 15 is a somewhat diagrammatic plan view illustrating the manner in which the liners are associated with the carton blanks and the blanks thereafter tubed to form knocked-down, lined carton structures.

Subsequent to the passage of the completed liner tubing beyond the former, it will pass between the squeeze rolls 48 and then cutting rolls 49 one of which has a knife edge acting to sever the continuous liner tube into unit lengths, such unit lengths being designated by the reference numeral 50. At this juncture the unit lengths are engaged and advanced by a conveyor 51 which, with reference to FIGURE 15, serves to deposit the unit lengths on a transverse conveyor 52 which in turn delivers them to a machine section, indicated generally at 53, wherein the liners are associated with carton blanks 54. The machine section 53 does not per se constitute a part of the instant invention insofar as its operating components are concerned, and details of such mechanism may be found, for example, in Bergstein Patent 2,114,621, entitled Mechanism for Forming Containers. Essentially, in such mechanism the container blanks are fed from a source of supply, such as a hopper, in timed relation, being advanced on a chain conveyor or the like, the blanks being first contacted by glue applying means, indicated generally at 55, acting to imprint glue areas on the blanks which will subsequently contact and secure the liner. Thereafter, the liners 50 are deposited on the blanks at a station 56, the liners being deposited in timed relation to the movement of the container blanks and oriented therewith so that a plurality of sweeps, such as the sweep 57 and 58, may thereafter act to infold the container blanks about the liners and adhesively secure them thereto.

Figure 13:
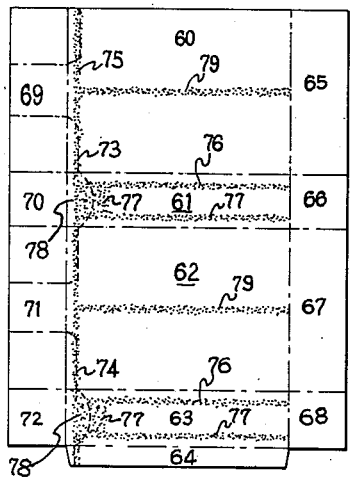
FIGURE 13 is a plan view of a carton blank with which the divided tubular liner may be associated, the blank showing the adhesive pattern applied thereto for securing the liner to the surrounding carton blank.

FIGURE 13 illustrates a typical container blank comprising body walls 60, 61, 62 and 63 in articulation in the order named, the body wall 63 carrying an attachment flap 64 by means of which the carton body is tubed. In the carton illustrated, the body walls terminate in bottom closure flaps 65, 66, 67, and 68; and the body walls have top closure flaps 69, 70, 71 and 72 at their opposite ends which, as illustrated, may be suitably perforated to provide tear lines 73 and 74 by means of which the carton structure and liner may be ruptured to gain access to the two compartments formed in the liner. Normally, the liner is adhered to the carton body only at spaced apart points sufficient to secure the liner to the body walls of the carton so that it will be erected concurrently with the erection of the flat-folded carton structure. However, in accordance with the instant invention, the liner is adhered to the carton body in such fashion that the carton and liner complement each other in strengthening the entire structure. Thus, the four body walls 60, 61, 62 and 63 are provided with a glue stripe 75 extending along their upper edges i.e. adjacent the top closure flap 69-72, and the narrow body wall panels 61 and 63 are provided with longitudinal glue stripe 76, 77. In addition, the wall panels 61 and 63 are provided with glue areas 77 in the areas of the tabs 78 defined by the tear lines 73 and 74. The body walls 60 and 62, which comprise the side walls of the carton structure, have longitudinally extending medial glue stripes 79 which are arranged to coincide with the opposite side edges of the divider strip which, it will remember, are sealed to the opposing walls of the liner in seams 8a and 8b.

Figure 14:
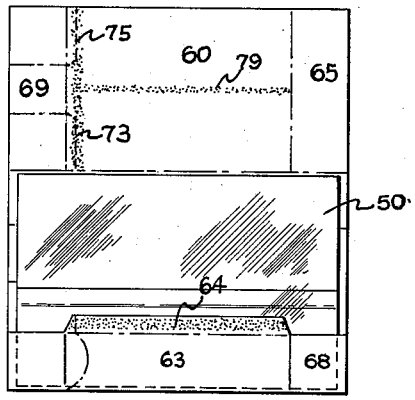
FIGURE 14 is a plan view similar to FIGURE 13 but showing the liner juxtaposed thereto and the carton blank infolded along one side edge.

As seen in FIGURE 14, the liner 50 is deposited on the body wall panels 61 and 62 with the undersurface of the liner contacting the adhesive stripes on those walls. Thereafter, body wall 63 is infolded, as by means of the sweep 57, whereupon adhesive may be applied to the attachment flap 64 by means of an applicator indicated diagrammatically at 80 in FIGURE 15. Thereafter the sweep 58 will serve to infold the body wall 60, thereby juxtaposing the free side edge of body wall 62 to attachment flap 64 and completing the tubing of the structure.

Figure 12:
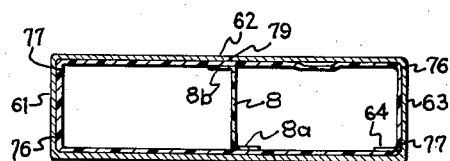
FIGURE 12 is a cross sectional view of an erected carton showing the partitioned liner disposed therein.

When the carton structure and liner are erected, the liner will be held square within the carton body in the manner seen in FIGURE 12; and it will be noted that the glue stripes 79 serve to effectively secure the opposite ends of the divider strip 8, i.e. the seams 8a and 8b, to the body walls 60 and 62, respectively, of the carton structure. This not only means that the two compartments will maintain their shape, but in addition the divider strip 8 will be maintained in essentially taut condition even though one of the compartments is emptied. The divider strip additionally serves to prevent the carton body walls from bowing outwardly when the structure is filled with product. The glue stripe 75 which extends about the upper edges of the body walls acts to maintain the top of the liner in fully opened condition, thereby facilitating the filling of the several compartments. It will be understood, of course, that the top and bottom edges of the liner will be suitably heat sealed to complete the top and bottom closures. The adhesive areas 77 acts to adhere the liner in the areas of the tab 78 which, when severed from the carton along their tear lines, serve to open the compartments in the liner so that the contents thereof may be readily dispensed.

It should be noted that, depending upon the dimensions of the carton, care must be taken to properly orient the liner structure with respect to the carton blank. That is, where adjacent carton body walls are of unequal width and the divided strip is of a width corresponding to an opposite pair of the carton body walls—usually the narrower pair—the divider strip must be so oriented that it will move to the erected condition in parallelism with the pair of body walls to which it corresponds in width.

Modifications may, of course, be made in the invention without departing from its spirit and purpose. For example, it has already been indicated that various forms and types of heat sealing materials may be employed, inclusive of papers and foils or combinations thereof having one or both surfaces treated, either by coating or lamination, with a heat sealable film; and this is true both of the liner web and the divider strip. While preferably both surfaces of the divider strip are of heat sealable character, it should be apparent that only one surface need be of such character, in which event the divider material should be folded upon itself along one side edge to present a heat sealable surface to the liner. Similarly, and if desired, both sides of the liner could be of heat sealable character, in which event a conventional overlap longitudinal seam could be employed. If desired, one side edge of the divider strip could be juxtaposed between and sealed to the marginal edges of the liner web as an incident of the formation of the longitudinal seam, whether it be of the fin type or otherwise.

Having thus described the invention in several exemplary embodiments, and with the understanding that modification may be made therein without departing from its spirit and purpose, what is desired to be secured and protected by Letters Patent is:

1. In a device for manufacturing flexible tubular liners divided internally into a plurality of compartments, means for continuously feeding a relatively wide web of liner forming material in a path of travel, means for continuously feeding and juxtaposing on said wider web a narrow web of partition forming material capable of being heat sealed to said wider web with a longitudinal edge of said narrow web contacting the wider web along a predetermined line of contact spaced inwardly from a side edge of said wider web, heat sealing means positioned to effect a continuous seal between the said longitudinal edge of said narrow web and the underlying surface of said wider web as said two webs are continuously advanced, an elongated horizontally disposed flat former extending lengthwise of and overlying the path of travel of said two webs with its undersurface positioned for contact with the upper surfaces of said webs, means for engaging and folding the opposite side edges of said wider web about said former with opposite marginal edge portions thereof juxtaposed, sealing means positioned to contact and seal together the juxtaposed marginal edge portions of said wider web to provide an essentially flat liner tube surrounding said former and having a continuous longitudinal seam overlying said former, said former having an elongated slot extending lengthwise thereof throughout at least its trailing portion, means for passing the remaining side edge at least of said narrow web through said slot as said webs are continuously advanced along said former, whereby to juxtapose the said remaining side edge of the narrow web to the inner surface of the tubed wider web in an area overlying said former, and heat sealing means overlying said former and positioned to contact the outer surface of said tubed wider web in alignment with the said remaining side edge of said narrow web, whereby to heat seal the said remaining side edge of said narrow web to the tubed wider web on the side thereof opposite the side in which the first named side edge of said narrow web is sealed, whereby said narrow web acts to divide said tubed wider web internally into a plurality of compartments.

2. The device claimed in claim 1 wherein the means for passing the remaining side edge of the narrow web through said elongated slot comprises an enlarged opening in said former at the leading end of said slot through which said narrow web is threaded with its remaining side edge overlying and contacting the upper surface of said former in an area laterally disposed with respect to said elongated slot, and wherein said heat sealing means for sealing the said remaining edge of said narrow web to said tubed wider web is displaced laterally from the said elongated slot in said former.

3. The device claimed in claim 1 wherein the means for passing the remaining side edge of said narrow web through said slot comprises a roller underlying said slot and having its uppermost peripheral portion extending upwardly into said slot, and wherein said heat sealing means for sealing the said remaining side edge of said narrow web to said tubed wider web overlies said roller.

4. The device claimed in claim 3 wherein the elongated slot in said former terminates at the trailing edge thereof in a hooked portion effective to separate the under surface of the remaining side edge of said narrow web from the underlying portion of the tubed wider web should it be adhered thereto.

5. In a device for forming continuous lengths of heat sealable materials into tubular sleeves divided internally into a plurality of compartments, a sealing roll, means for continuously delivering a pair of webs to said sealing roll in superposed relation, a heating bar coacting with said sealing roll to continuously seal a side edge of one of said webs to the remaining web, said remaining web having a width at least several times the width of said first named web, an elongated generally flat rectangular former lying beyond said sealing roll, web supporting means underlying said former, means for continuously advancing said webs between said former and said web supporting means with the narrower web uppermost, sweep means for folding the opposite side edges of the wider web about said former and for juxtaposing marginal edge portions thereof, sealing means positioned to contact and seal together the juxtaposed marginal edge portions of said wider web to define a continuous longitudinal seam, an elongated slot in said former extending inwardly from the trailing end thereof, said slot being positioned to receive an unsecured portion of the narrower web, means for causing the free side edge at least of said narrower web to project upwardly through said slot for contact with the overlying portion of said tubed wider web, and heat sealing means overlying said former in alignment with the free side edge of said narrower web, said heat sealing means being positioned to contact the overlying portion of the wider web and through it effect a continuous heat seal between the juxtaposed areas of the two webs, and means for thereafter transversely severing the sealed together webs into unit lengths.

6. The device claimed in claim 5 wherein the heating bar coacting with said sealing roll is curved to conform to the periphery of said roll, and wherein means are provided for moving said curved heating bar from an operative to an inoperative position.

7. The device claimed in claim 6 wherein the means for continuously advancing said webs comprise pinch rolls, clutch means controlling the movement of said pinch rolls, and means operatively connecting said clutch means and the means for moving said heating bar for joint movement, whereby said heating bar will be moved to its operative position when said clutch means is engaged and returned to the inoperative position when said clutch means is disengaged.

8. The device claimed in claim 7 wherein the means for moving said heating bar from the operative to the inoperative position includes a fluid actuated cylinder operatively connected to said heating bar, and wherein the means operatively connecting the clutch means and the means for moving said heating bar includes valve means for controlling the flow of fluid under pressure to said cylinder.

9. In a device for continuously forming multiple-cell inner-lined containers, a first machine section, means in said first section for continuously advancing and juxtaposing a pair of webs one of which is at least several times wider than the other, means for sealing a side edge of the narrower web to the wider web along a continuous line extending lengthwise of said wider web intermediate its opposite side edges, a horizontally disposed elongated flat former extending in the direction of travel of said webs, means for feeding said webs beneath said former with the narrower web uppermost, means for continuously folding the opposite side edges of said wider web over the opposite side edges of said former and for juxtaposing the opposite marginal edges of said wider web, sealing means positioned to effect a seal between the juxtaposed edges of said wider web, thereby forming a tube, an elongated slot in said former extending lengthwise thereof and projecting inwardly from the trailing end of said former, means for causing the free side edge of said narrower web to pass through said slot for contact with the inner surface of said tube in an area overlying said former, means for heat sealing last named side edge of said narrower web to said tube, means beyond said former for severing said tube transversely into unit lengths, means for engaging and advancing the tube lengths so formed to a combiner station, means at said combining station for sequentially depositing said unit lengths onto the body walls of carton blanks advancing through said combining station, said combining stations forming the part of a second machine section including means for advancing carton blanks in timed relation, means for applying predetermined areas of adhesive to the carton blanks in advance of their passage through said combining station, and means beyond said combining station for infolding some at lease of the body walls of said blank about said unit lengths to provide knocked-down tubular cartons each containing a flat-folded tubular liner having an internal partition dividing it into a plurality of compartments.

10. The device claimed in claim 9 wherein the elongated slot in said former is positioned to overlie the free side edge of said narrower web, and wherein the means for causing said narrower web to project upwardly through said slot comprises a wheel underlying said slot and having a portion thereof projecting upwardly through said slot, so as to press portions of said webs upwardly therethrough.

11. A method of continuously forming a tubular liner having an internal partition dividing said liner into a plurality of compartments, which comprises advancing a plurality of webs one of which is substantially wider than another, and as said webs are being advanced juxtaposing the narrower web to the wider one and sealing a side edge of the narrower web to the wider web along a seam line extending lengthwise of the wider web, tubing the said wider web with the narrower web enclosed therein, including the step of sealing the remaining side edge of said narrower web to said tubed wider web along a seam line extending lengthwise of the said tubed web on the side thereof opposite said first named seam line.

12. A method of continuously forming a tubular liner having an internal partition dividing said liner into a plurality of compartments, which comprises advancing a pair of webs one of which is substantially wider than the other and as said webs are being advanced, juxtaposing said two webs and sealing one side edge of the narrower web to the wider web along a continuous seam line extending lengthwise of the wider web, tubing the advancing wider web with the narrower web enclosed therein, and thereafter sealing the remaining side edge of said narrower web to said tubed wider web along a continuous seam line extending lengthwise of said tubed web on the side thereof opposite said first named seam line.

13. A method of continuously forming a tubular liner having an internal partition dividing said liner into a pair of compartments, which comprises advancing a pair of flat webs one of which is substantially wider than the other, said wider web having at least one heat sealable surface and said narrower web having two heat sealable surfaces, and as said webs are being advanced juxtaposing said narrower web to the heat sealable surface of said wider web and heat sealing one side edge of said narrower web to said wider web along a continuous seam line extending lengthwise of said wider web along a line spaced inwardly from a side edge thereof, forming said advancing wider web into an essentially flat tube surrounding said narrower web, including the step of bringing the opposite marginal side edges of the wider web together in face-to-face relation and heat sealing said marginal edges together to form a fin type seam, and effecting a heat seal between the remaining side edge of said narrower web and said tubed wider web to form a second continuous seam line, said last named seam line lying on the side of said flat liner tube opposite said first named seam line.

14. The method claimed in claim 13 including the steps of thereafter severing the said tubed liner transversely at spaced apart intervals to form individual liners, associating said individual liners so formed with flat carton blanks having four body walls in articulation, aligning each of said liners to overlie an adjacent pair of said carton body walls with one of the seam lines in said liner contacting one of said adjacent body walls intermediate the opposite side edges of the contacted body wall, including the step of adhering the liner to said body wall along a line of adhesion coinciding with said seam line, infolding the remaining carton body walls around said liner to form a tubular carton body, including the step of adhering the opposite side of the liner to one of said last named body walls along a line of adhesion coinciding with the other of said seam lines.

15. A method of continuously forming carton structures having a tubular liner including an internal partition dividing said liner into a plurality of compartments, which comprises advancing a plurality of webs one of which is substantially wider than another, and as said webs are being advanced, juxtaposing the narrower web to the wider web and sealing a side edge of the narrower web to the wider web along a seam line extending lengthwise of the wider web, tubing the said wider web with the narrower web enclosed therein, including the step of sealing the remaining side edge of the narrower web to said tubed wider web along a seam line extending lengthwise of the said tubed web on the side thereof opposite said first named seam line, severing the tubed liner structure so formed transversely at spaced apart intervals to form individual liners, associating said individual liners with flat carton blanks having four body walls in articulation, with said individual liners overlying adjoining carton body walls, infolding the remaining carton body walls around the liners to form tubular carton bodies, including the step of adhering the opposite sides of the liners to portions of the body walls contacted thereby, whereby to provide knocked-down carton structures each having a multiple compartment liner enclosed therein.

16. A method of continuously forming carton structures having a tubular liner including an internal partition dividing the liner into a plurality of compartments, which comprises advancing a pair of webs one of which is substantially wider than the other, and as said webs are being advanced, juxtaposing said webs and sealing one side edge of the narrower web to the wider web along a continuous seam line extending lengthwise of the wider web, tubing the advancing wider web with the narrower web enclosed therein, sealing the remaining side edge of the narrower web to said tubed wider web along a continuous seam line extending lengthwise of the tubed web on the side thereof opposite said first named seam line, severing the tubed liner so formed into individual liners, sequentially depositing the individual liners onto a series of advancing carton blanks having four body walls in articulation, with the liners overlying an adjoining pair of the carton body walls, infolding the remaining carton body walls about the liners and adhering the opposite sides of the liners to the body walls of the carton blanks so as to provide knocked-down lined carton structures, including the step of orienting said liners relative to said carton body walls so that said liners, including the narrower partitioning webs therein, will be automatically expanded upon the erection of the carton structures.

References Cited in the file of this patent

UNITED STATES PATENTS

| | | |
|---|---|---|
| 2,099,257 | Bergstein | Nov. 16, 1937 |
| 2,493,337 | Buttery | Jan. 5, 1950 |
| 2,617,576 | Bergstein | Nov. 11, 1952 |
| 2,779,255 | Clark et al. | Jan. 29, 1957 |
| 2,866,392 | Scarvelis | Dec. 30, 1958 |
| 2,879,933 | Bergstein et al. | Mar. 31, 1959 |
| 2,883,913 | Piazze | Apr. 28, 1959 |
| 2,885,932 | Easter | May 12, 1959 |